June 21, 1960  F. HAMMERLING  2,941,556
TENONING ATTACHMENT FOR TABLE SAWS
Filed April 10, 1957  2 Sheets-Sheet 1
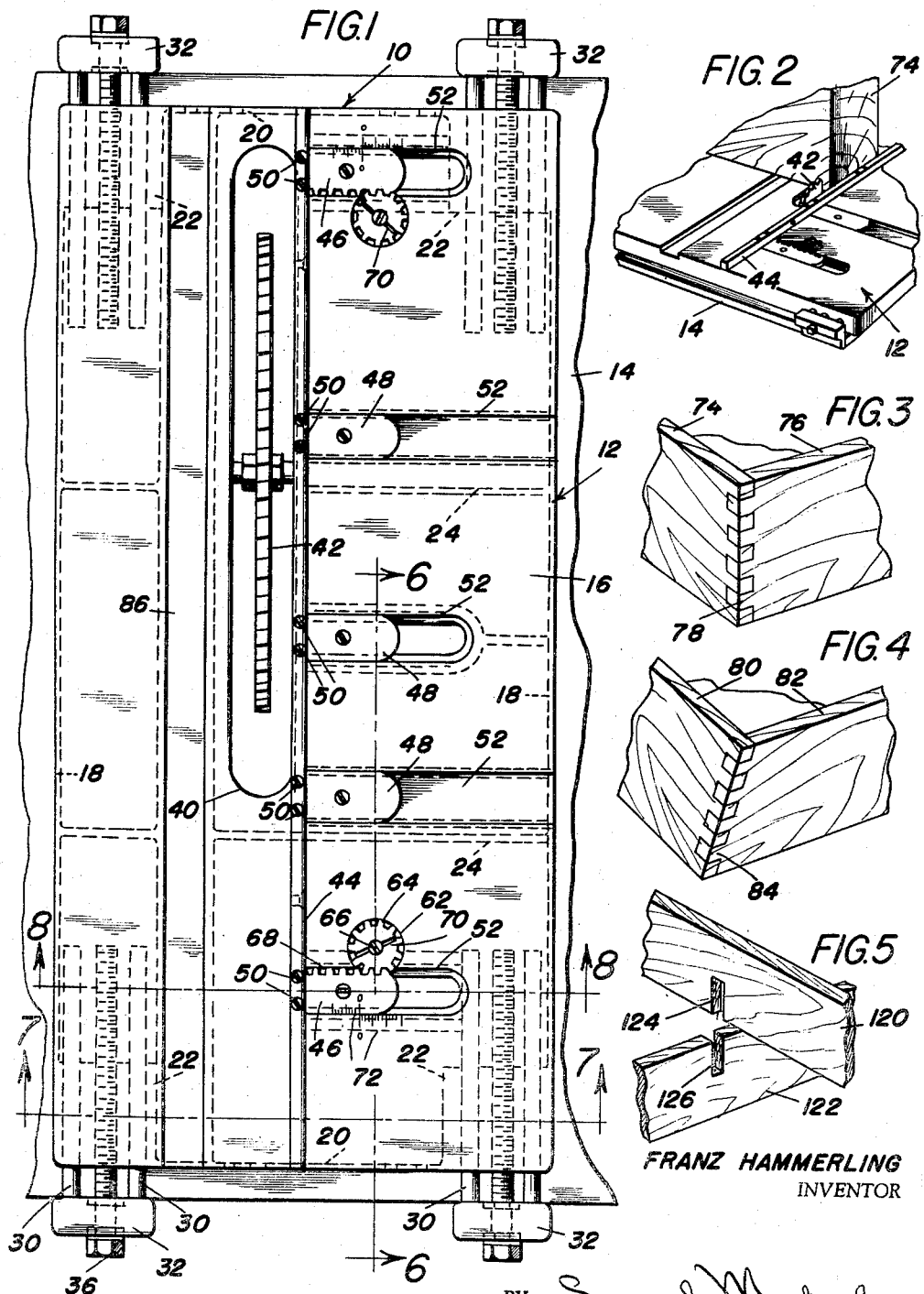
FRANZ HAMMERLING
INVENTOR
BY Samuel Meerkreebs
ATTORNEY

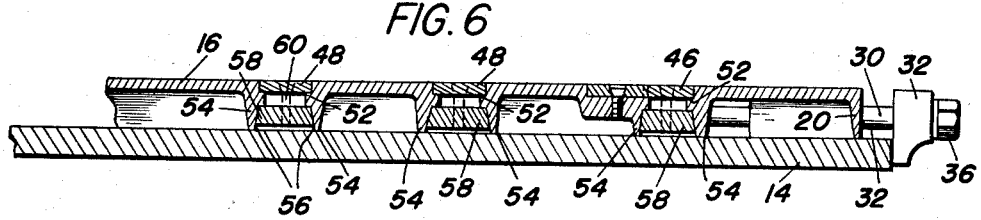
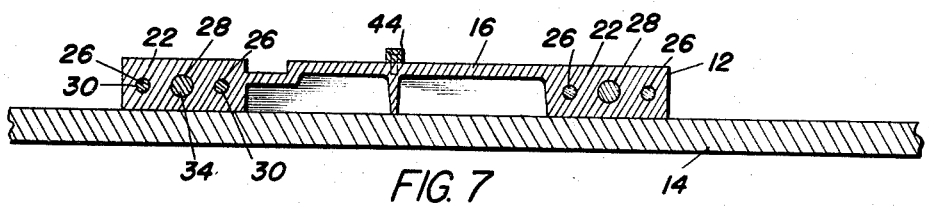
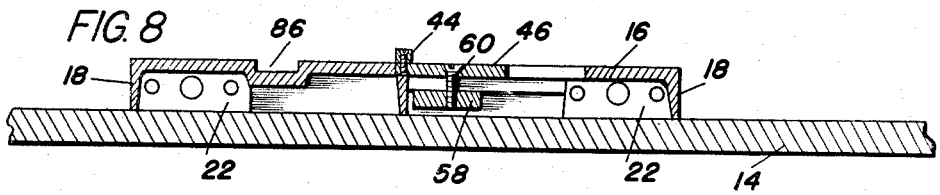
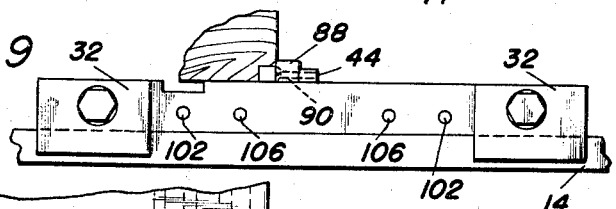
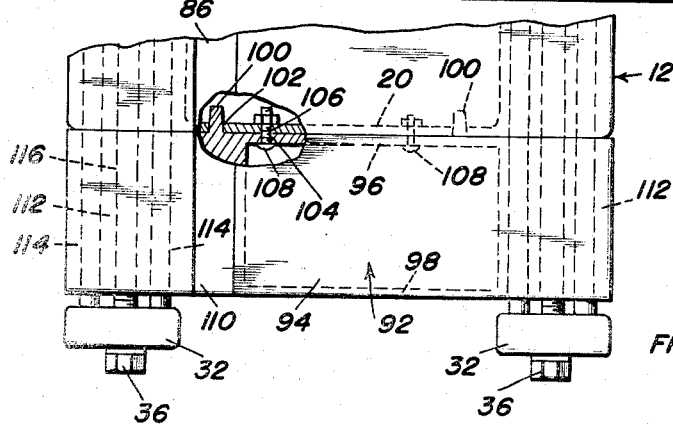

United States Patent Office 2,941,556
Patented June 21, 1960

2,941,556

TENONING ATTACHMENT FOR TABLE SAWS

Franz Hammerling, 1113 5th Ave. NE., Calgary, Alberta, Canada

Filed Apr. 10, 1957, Ser. No. 652,039

4 Claims. (Cl. 144—198)

This invention relates in general to new and useful improvements in woodworking equipment, and more specifically to a new and desirable attachment for table saws and the like for the purpose of producing tenons and recesses in the ends of lumber.

In order to form the necessary tenons for the purpose of joining together two pieces of lumber with their ends in interlocking relation, it is necessary that an operator of a table saw or a bench saw continuously shift the guide for the work and to accurately position such guides so that the spacing between adjacent tenons remains constant. Not only is this impractical, but also it is practically impossible for one to accurately position a guide for the lumber being sawed whereby all tenons are of the same width and are equally spaced to show a proper interlocking of the two pieces of lumber.

It is therefore the primary object of this invention to provide an attachment which may be readily clamped on the table of a table or bench saw, such attachment being provided with a guide for a work piece in which tenons are to be cut, the guide being provided with suitable means to effect the shifting thereof and the accurate positioning thereof in order to insure that the tenons are of a constant width and equally spaced.

Another object of this invention is to provide an improved tenoning attachment for table saws and the like, the tenon attachment being in the form of a relatively large base having means for clamping the same to a saw table in overlying relation with respect thereto, having slidably mounted on the base for guided movement a guide member which can move only parallel to the saw blade of a saw and which is provided with means accurately positioning the guide after each adjustment.

Another object of this invention is to provide a tenon attachment for table saws and bench saws, the tenon attachment including a base intended to overlie a saw table having clamp means for attachment to a saw table, the base having mounted thereon for adjustable positioning relative to a saw blade a guide member, there also being formed in the base a miter gauge slot whereby work pieces may be disposed at desired angles to the saw blade during a tenon operation so that the end result will be in two-interlocked pieces disposed other than at right angles to each other and at the desired angle.

A further object of this invention is to provide an improved tenon attachment for table saws and the like, the tenon attachment including a base which is of relatively simple construction and which has relatively simple clamp means for attachment to a saw table, the base being provided with extensible sections whereby the base may be adapted to saw tables of various widths.

These together with other objects and advantages which will subsequently become apparent reside in the details of construction and operation as more fully hereinafter described and claimed, reference being had to the accompanying drawing forming a part hereof, wherein like numerals refer to like parts throughout, and in which:

Figure 1 is a fragmentary plan view of a table saw and shows mounted on the central portion of the saw table thereof the tenoning attachment which is the subject of this invention;

Figure 2 is a fragmentary perspective view on a reduced scale showing the tenoning attachment being used in the initial formation of a tenon;

Figure 3 is a fragmentary perspective view of a corner joint formed through the use of the tenoning attachment;

Figure 4 is a fragmentary perspective view showing a modified form of corner joint formed with the tenoning attachment, the pieces joined together being disposed at an angle other than a right angle;

Figure 5 is a fragmentary exploded perspective view showing a pair of strips intended to be mounted in crossed relation, recesses formed in the strips using the tenoning attachment;

Figure 6 is a fragmentary sectional view taken substantially upon the plane indicated by the section line 6—6 of Figure 1 and shows the relationship between guide shoes for the guide member and the base of the tenoning attachment, there also being illustrated generally the details of the clamp for securing the base of the tenoning attachment to the saw table;

Figure 7 is a transverse sectional view taken substantially on line 7—7 of Figure 1 and shows the specific relationship of the base at one end thereof and the further details of the clamp means;

Figure 8 is a fragmentary transverse vertical sectional view taken substantially upon the plane indicated by the section line 8—8 of Figure 1 and shows further the details of the means for mounting the guide member on the base of the tenoning attachment;

Figure 9 is a fragmentary side elevational view of the saw table and showing the guide member of the tenoning attachment provided with a spacer for forming the initial recess in a tenoning operation at the end of the work piece; and Figure 10 is a fragmentary plan view of one end of the base of the tenoning attachment and shows the manner in which an extension may be mounted thereon.

Referring now to the drawings in detail, it will be seen that there is illustrated the tenon attachment which is the subject of this invention, the tenon attachment being referred to in general by the reference numeral 10. The tenon attachment 10 includes a base which is referred to in general by the reference numeral 12. The base 12 is illustrated as being mounted on a saw table 14 in overlying relation with respect thereto.

The base 12 may be of any desired construction. However, it is preferred that it be cast and the casting may be of a light weight material such as aluminum. By casting the base 12, the weight thereof may be cut down as against fabrication. The base 12 will include an upper plate 16 which is supported along the sides thereof by depending side flanges 18. The ends of the plate 16 will be reinforced by end flanges 20 which depend therefrom. At the corners of the plate 16 there will be enlarged blocks 22 whose purpose will be set forth in detail hereinafter. Also, the plate 16 will be reinforced intermediate the ends thereof by suitable transverse ribs 24, as is best illustrated in Figure 1.

In order that the base 12 may be clamped upon the saw table 14, the blocks 22 are provided with spaced bores 26 (Figure 7) which open out through the ends of the base 12. Also, each block 22 is provided with a central bore 28 which opens out through its respective end of the base 12. Disposed in the bores 26 in each block 22 is a pair of parallel guide pins 30 (Figures 1 and 6) which carry a clamp block 32. Rotatably journaled in each clamp block 32 is a clamping bolt 34 having a head 36. Each bore 28 is internally threaded and has threadedly engaged therein a threaded portion of the clamp bolt 34. Inasmuch as a saw table, such as the saw table 14 has the ends thereof square cut, due to the mounting of the clamp blocks 32 by means of the guide pins 30, in most instances it is merely necessary to mount the base 12 on the saw table 14 and to tighten down on the clamp bolts 34. However, care must be taken to assure that the base 12 is mounted square on the saw table 14.

Referring once again to Figure 1 in particular, it will be seen that the plate 16 of the base 12 is provided with an elongated opening 40. The opening 40 is of a size to receive the maximum diameter of a saw blade which is to be used in conjunction with the tenoning attachment 10 and is of a width to both permit tilting of the saw blade and the use of a special tenon blade, such as the blade 42, or a "Dado" attachment.

In order that a work piece having tenons cut therein may be properly spaced with respect to the special tenon blade 42 for the cutting of each recess and the forming of tenons by such process, there is mounted on the upper surface of the plate 16 a guide member or tenoning slide rail 44 which extends the length of the base 12. The guide member is supported at longitudinally spaced intervals by a plurality of shoes which include endmost shoes 46 and central shoes 48. The guide member 44 overlies one end of each of the shoes 46 and 48 and is secured thereto by means of suitable fasteners 50.

Referring now to Figures 1 and 6 in particular, it will be seen that the shoes 46 and 48 seat in recesses 52 formed in the plate 16 for guided movement transversely of the base 12. Also, the plate 16 is reinforced immediately adjacent the recesses 52 by means of depending ribs 54. The ribs 54 have upwardly tapered inner surfaces 56 and have received therebetween a clamp plate 58. The clamp plate 58 directly underlies its associated one of the shoes 48 or 46 and is connected thereto by a clamping fastener 60. At this time it is pointed out that certain of the recesses or track ways 52 may extend through a side edge of the base 12, as is best illustrated in Figure 1, whereas others of the track ways 52 may terminate short thereof.

In order that the guide member 44 may be accurately positioned with respect to the blade 42, there is formed adjacent the end of those ones of the track ways 52 generally circular recesses 62. The recesses 62 have disposed therein for rotation gears 64 which are mounted on pins 66 for rotation. Also, the shoes 46 will be provided with rack portions 68 which engage the gears 64. The gears 64 will be provided with slots 70 to facilitate the turning thereof so that the shoes 46 may be shifted as is necessary to position the guide member 44. Formed on the plate 16 adjacent the shoes 46 and on the shoes 46 are suitable gauge portions 72 to facilitate the proper positioning of the guide member 44.

Because of the particular manner in which the guide member 44 is mounted on the base 12, it will be readily apparent that it may be accurately positioned with respect to the blade 42. This is absolutely necessary inasmuch as the spacing between adjacent tenons must be the same as the width of the tenon. If the spacing is too great, then the tenons will have a loose fit. On the other hand, if the spacing is too small, the tenons will fit too tight. The particular mounting of the guide 44 is such that one has what may be considered a micrometer adjustment of the guide member 44 and by utilizing the gauge portion 72 properly, the guide member 44 may be positioned as closely as desired.

Referring now to Figure 3 in particular, it will be seen that there is illustrated two pieces of lumber 74 and 76 which have an interlocked joint 78. The pieces of lumber 74 and 76 are disposed at right angles to each other and the tenons formed with the tenoning attachment 10 serve to interlock the pieces of lumber 74 and 76 together to form the joint 78.

Referring now to Figure 4 in particular, it will be seen that there is illustrated an interlocked joint between two pieces of lumber 80 and 82. However, the joint 84 between the pieces of lumber 80 and 82 is different from the joint 78 in that the pieces of lumber 80 and 82 are not disposed at right angles, but are sloping with respect to each other. Therefore, the pieces of lumber 82 which may be considered work pieces, cannot be disposed normal to the saw blade 42 and to the guide member 44 as is shown in the operation of Figure 2. In order that the work pieces 80 and 82 may be disposed at the proper angle to the saw blade 42 and the guide member 44, there is formed in the base 12 an elongated guide slot 86 for receiving a conventional miter gauge (not shown) so that the work pieces may be maintained at the angle necessary.

Referring now to Figure 9 in particular, it will be seen that there is illustrated clamped to that face of the guide member 44 adjacent the blade 42 a spacer 88. The spacer 88 is secured to the guide member 44 by means of fasteners 90. When it is necessary to form the initial recess in a work piece in the edge thereof, as in the case of the upper end of the work piece 76 illustrated in Figure 3, it is necessary that there be provided a suitable spacer, such as the spacer 88 so as to position the edge of the work piece in alignment with the edge of the blade 42. The spacer 88 will be of a width equal to the width of the tenon to be formed. If desired, the spacer 88 may be cut with the saw blade 42 after the guide member 44 has been properly positioned for the cutting of the tenon. This is true inasmuch as the width of the spacer 88 is equal to the spacing between the guide member 44 and the blade 42. After the initial recess has been cut, the spacer 88 may be removed.

Referring now to Figure 10 in particular, it will be seen that there is illustrated a base extension referred to in general by the reference numeral 92. The base extension 92 includes a plate 94 having disposed at opposite ends thereof depending flanges 96 and 98. The flange 96 will be provided with projecting tongues 100 which will pass through suitable links 102 formed in the end flange 20 of the base 12. Also, the flanges 96 and 20 will be provided with aligned openings 104 and 106, respectively, receiving bolts 108.

The plate 94 will be provided with a guide slot 110 which will be aligned with the guide slot 86 of the plate 16. Also, the sides of the base 92 will be in the form of blocks 112 which will correspond to the blocks 22. The blocks 112 will be provided with bores 114 and 116 which will correspond to the bores 26 and 28. The clamp blocks 32 will be mounted on the extensions 92 in the same manner described above in respect to the base 12. It will be understood that the extensions 92 will be of a size to permit the base 12 to fit any saw table desired.

Referring now to Figure 5 in particular, it will be seen that there is illustrated a pair of strips 120 and 122. The strips 120 and 122 are portions of a lattice work on egg crate arrangement. The strip 120 will be provided in the lower edge thereof with a plurality of downwardly opening recesses 124. The strips 122 will be provided in the upper edge thereof with a plurality of upwardly opening recesses 126. The recesses 124 and 126 will be cut to a depth equal to one half the depth of the respective strips 120 and 122. Thus when the strips 120 and 122 are interlocked, the upper edges thereof will be coplanar. The tenon attachment 10 can be used by suitable positioning of the guide member 44 remote from the blade 42, may be used in cutting the recesses 124 and 126 at the necessary spacing for making the lattice or egg crate arrangement.

The foregoing is considered as illustrative only of the principles of the invention. Further, since numerous modifications and changes will readily occur to those skilled in the art, it is not desired to limit the invention to the exact construction and operation heretofore set forth and accordingly all suitable modifications and equivalents may be resorted to, falling within the scope of the appended claims.

What is claimed is new is as follows:

1. A tenoning attachment for table saws having a horizontal table top including a vertically disposed rotary saw bade, said attachment comprising a base plate having a planar upper surface and adapted to overlie the saw table top, clamp means carried by said base plate and disposed beneath the upper surface of the same for securing the base plate on top of the horizontal table top of the saw, said base plate having an elongated slot through which said saw blade may project, an elongated work piece guide strip disposed parallel to the cutting plane of said blade and projecting above the upper surface of said base plate, said guide being of a width no greater than that of the saw blade to facilitate receipt in tenoning grooves cut thereby, and calibrated positioning means secured to said guide strip and reciprocal therewith in said base plate and beneath the upper surface thereof, said positioning means being reciprocal normal to the cutting plane of said blade whereby stock having tenoning grooves cut therein may be moved over said positioning means and at right angles to said guide strip.

2. The structure of claim 1; an elongated work piece spacer strip detachably secured to said guide strip and extending toward the plane of said blade for initially positioning a work piece to form a groove inwardly of one side of the same.

3. The structure of claim 1; said positioning means including a plurality of parallel trackways in the upper surface of said base plate normal to the guide strip, an upwardly tapered inner surface underlying said trackways, a clamp plate disposed in said upwardly tapered inner surfaces, a shoe secured to said guide strip beneath the upper surface of said base plate and overlying said clamp plate, and means securing the shoe to a clamp plate for retaining the guide strip in an adjusted position.

4. The structure of claim 3; said positioning means including additional trackways parallel to the first mentioned trackways, additional guide shoes secured to said guide strip and disposed in said additional trackways beneath the upper surface of said base plate, said additional shoes including a gear rack at one side edge thereof, circular recesses formed in said base plate in communication with said additional trackways, gear elements journaled in said circular recesses beneath the upper surface of said base plate and meshingly engaging the gear rack.

References Cited in the file of this patent

UNITED STATES PATENTS

| | | |
|---|---|---|
| 255,302 | Luther | Mar. 21, 1882 |
| 404,233 | Teeguarden | May 28, 1889 |
| 758,921 | Jones | May 3, 1904 |
| 816,424 | Bemis | Mar. 27, 1906 |
| 1,651,846 | Stauder | Dec. 6, 1927 |
| 1,713,329 | Clayton | May 14, 1929 |
| 2,616,459 | Johnson | Nov. 4, 1952 |
| 2,673,582 | Thomes et al. | Mar. 30, 1954 |
| 2,715,924 | Norris | Aug. 23, 1955 |
| 2,777,485 | Farrow | Jan. 15, 1957 |
| 2,801,652 | Meeker | Aug. 6, 1957 |